G. H. JUDIA.
COVER FOR SYRUP PITCHERS.
APPLICATION FILED FEB. 10, 1914.
1,131,383.
Patented Mar. 9, 1915.
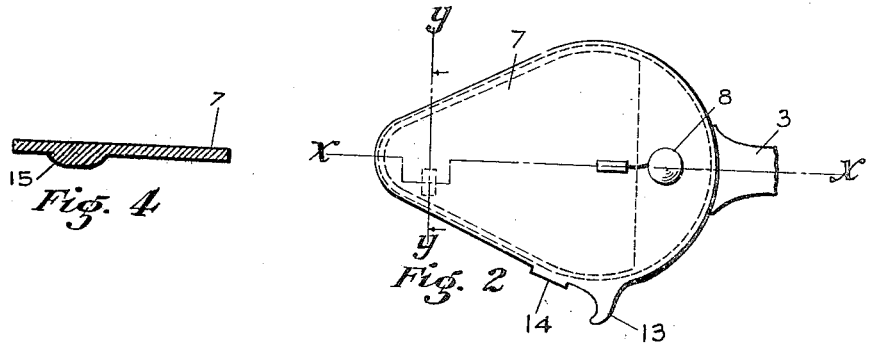
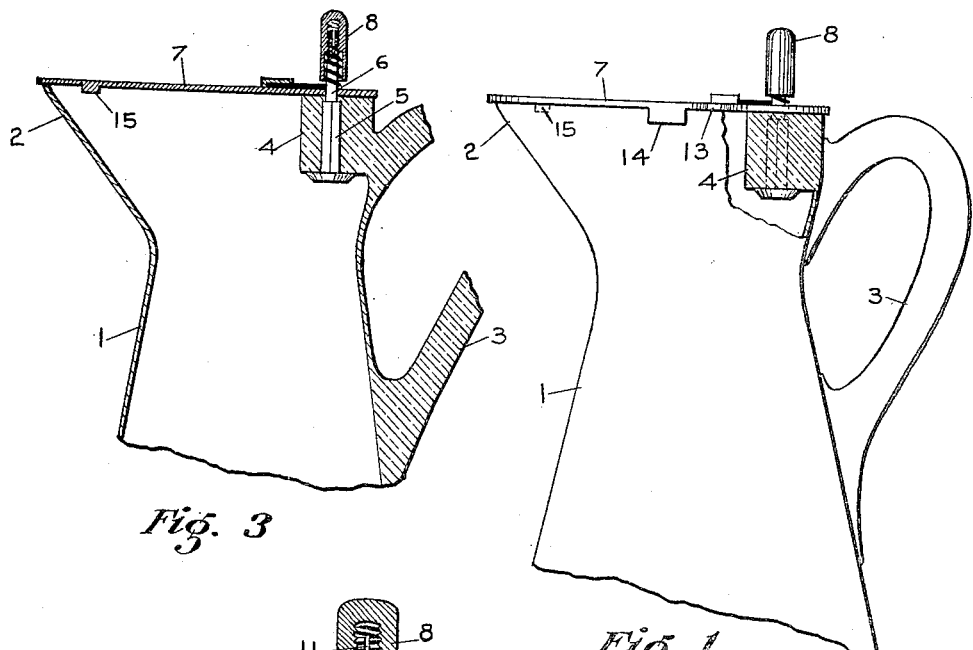
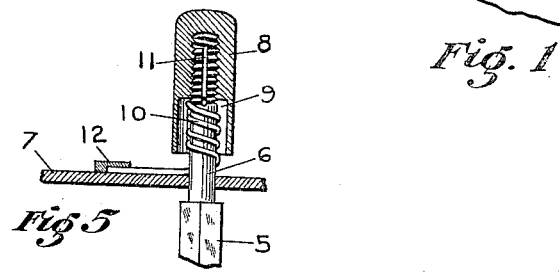
WITNESSES:
C. J. Milam
R. E. C. Bruckner
INVENTOR
G. H. JUDIA
BY
John M. Pelleman
ATTORNEY

UNITED STATES PATENT OFFICE.

GEORGE H. JUDIA, OF CISCO, TEXAS, ASSIGNOR OF ONE-HALF TO B. S. HUEY, OF HOUSTON, TEXAS.

COVER FOR SYRUP-PITCHERS.

1,131,383.  Specification of Letters Patent.  Patented Mar. 9, 1915.

Application filed February 10, 1914. Serial No. 817,723.

*To all whom it may concern:*

Be it known that I, GEORGE H. JUDIA, a citizen of the United States, residing at Cisco, in the county of Eastland and State of Texas, have invented certain new and useful Improvements in Covers for Syrup-Pitchers, of which the following is a specification.

My invention relates to a new and useful cover for cream and syrup pitchers, and its object, broadly stated, is to protect the contents of a cream or syrup pitcher from dust, flies, ants, or other insects, by providing a cover that in its closed position will completely obstruct the orifice of the pitcher, and which will automatically be returned to its closed position by a spring after the pitcher has been used.

It is another object of the invention to provide a cover for a cream or syrup pitcher that may be very easily opened by the thumb of the hand in which the pitcher is held.

Finally the object of my invention is to provide a device of the character described, that will be strong, durable, simple and efficient, and comparatively easy to construct, and also one that will not be likely to get out of order.

With these and various other objects in view, my invention has relation to certain novel features of the construction and use, an example of which is described in the following specification and is illustrated in the accompanying drawing, wherein:

Figure 1 is a view showing in side elevation the upper portion of a cream or syrup pitcher equipped with my improved cover. Fig. 2 is a top view of the same. Fig. 3 is a vertical sectional view, the section being taken upon the line $x$—$x$ of Fig. 2. Fig. 4 is a detail sectional view taken upon the line $y$—$y$ of Fig. 2. Fig. 5 shows a portion of Fig. 3 drawn to an enlarged scale.

Referring now more particularly to the drawing, wherein like reference characters designate similar parts in all the figures, the numeral 1 denotes a cream or syrup pitcher which may be made of glass, earthen ware, metal, or some other suitable material, and is formed at opposite sides of the top with a spout 2 and a handle 3. Adjacent to the handle of the pitcher, there is interiorly formed upon the neck thereof a protuberance 4, through which there is vertically passed a pin comprising lower and upper portions 5 and 6, and formed upon its lower extremity with a head abutting against the underside of the protuberance 4. The portion 5 of said pin is of square cross section, and is received by a similarly shaped aperture in the protuberance 4, rotation of the pin relative to the pitcher thus being positively prevented. The upper portion 6 of said pin is preferably of round cross section, and is passed loosely through a cover 7 consisting of a metal plate shaped to fit the orifice of the pitcher, the pin being extended above said cover a short distance. The upper extremity of the pin is threaded, and receives a vertically elongated screw cap 8, formed with a recess 9 extending into its lower end, which end is normally spaced slightly from the cover 7. Upon the portion 6 of said pin, there is coiled a spring 10, having its upper end abutting against the top of the recess 9, said end being furthermore engaged in a slot 11 which bifurcates the threaded end of the pin.

The spring 10, has its lower end portion extended upon the cover 7 a short distance toward the spout of the pitcher, the extremity of said portion being rigidly engaged with the cover as indicated at 12. The spring 10 is sufficiently compressed between the cover 7 and the cap 8 to hold said cover pressed firmly upon the pitcher, so that when the cover is in its closed position there will be no aperture or crack through which insects may gain access to the pitcher. The vertically acting pressure of the spring 10 has a further utility in that it tends to hold the cap 8 against accidental rotation. It is apparent that the degree of compression to which the spring 10 is subjected may be regulated by vertically adjusting the cap 8. Besides being vertically compressed the spring 10 is subject to a certain degree of torsion tending to impress upon the cover 7 a clock-wise rotation about the member 6. The cover 7 is provided at its edge with a slight hook 13 which when engaged by the thumb of the hand holding the pitcher and subjected to a rearward pressure, will subject the cover to a counter clock-wise rotation shifting said cover to its open position. As soon as the hook 13 is released, the torsion of the spring 10 will immediately return the cover to its closed position, the return motion being limited through the contact of a stop 14 with the top of the pitcher. The stop 14 will preferably have the nature of a lug formed upon the edge of the cover 7 adjacent to the hook 13.

When cream or syrup is being poured from a pitcher equipped with my improved cover, it is probable that a certain amount of the cream or syrup will adhere to the edges of the spout, and it is desirable to prevent the cover 7 from dislodging this small amount of cream or syrup onto the exterior surface of the pitcher, as the cover undergoes its return motion. To accomplish this result, that portion of the cover which engages over the spout is formed on its underside with a slight protuberance 15, which as the cover returns to its normal position will contact with the top of the pitcher and slightly elevate the cover above the edges of the spout, at the same time reducing the speed of the return motion. The cover will settle lightly into place without dislodging from the edges of the spout any small portion of the contents of the pitcher that may have adhered to said edges.

While the above described invention has been specified as particularly adapted for use in conjunction with cream or syrup pitchers, it is to be understood that the cover has an application to numerous other vessels and in this particular no limitation is placed upon its scope.

The invention is presented as including all such changes and modifications as are included by the terms of the following claims:

What I claim is:

1. In a device of the character described, the combination with a pitcher, of a swivelly mounted cover surmounting the pitcher having the nature of a laterally movable plate, a spring acting upon said cover tending to maintain the same normally closed, and a protuberance formed upon the underside of the cover, serving to elevate the cover through contact with the spout as the cover undergoes a return motion to its closed position.

2. In a device of the character described, the combination with a pitcher, of a vertically disposed pivot pin mounted in the upper portion of the pitcher and restricted against rotation relative to the pitcher, a cover surmounting the pitcher having the nature of a metal plate, said pin being passed through the cover and projecting above the same, a cap mounted upon the upper extremity of said pin, a spring mounted upon said pin between the cap and cover, exerting a downward pressure upon the cover, maintaining the same seated, and exerting a rotative impulse upon the cover maintaining the same in its closed position, and a protuberance provided upon the underside of the cover, serving to contact with the spout as the cover returns to its closed position, thereby elevating the cover slightly above the spout.

In testimony whereof I have signed my name to this specification in the presence of two subscribing witnesses.

GEORGE H. JUDIA.

Witnesses:
J. J. BUTTS,
F. M. OLDHAM.

Copies of this patent may be obtained for five cents each, by addressing the "Commissioner of Patents, Washington, D. C."